US005790188A

United States Patent [19]
Sun

[11] Patent Number: 5,790,188
[45] Date of Patent: Aug. 4, 1998

[54] COMPUTER CONTROLLED, 3-CCD CAMERA, AIRBORNE, VARIABLE INTERFERENCE FILTER IMAGING SPECTROMETER SYSTEM

[75] Inventor: Xiuhong Sun, North Andover, Mass.

[73] Assignee: Flight Landata, Inc., Lawrence, Mass.

[21] Appl. No.: 524,864

[22] Filed: Sep. 7, 1995

[51] Int. Cl.⁶ .................................................. H04N 7/18
[52] U.S. Cl. ........................................ 348/144; 348/143
[58] Field of Search .................................... 348/144, 135, 348/31, 42, 143, 145, 147; 356/328, 301; 250/339; H04N 7/18

[56] References Cited

U.S. PATENT DOCUMENTS

| | | | |
|---|---|---|---|
| 4,045,795 | 8/1977 | Fletcher et al. | 343/5 CM |
| 4,134,683 | 1/1979 | Goetz et al. | 356/407 |
| 4,805,015 | 2/1989 | Copeland | 348/144 |
| 4,862,257 | 8/1989 | Ulich | 348/31 |
| 5,027,199 | 6/1991 | Suzuki | 348/42 |
| 5,043,571 | 8/1991 | Hasegawa | 250/226 |
| 5,045,937 | 9/1991 | Myrick | 348/144 |
| 5,048,959 | 9/1991 | Morris et al. | 356/301 |
| 5,149,959 | 9/1992 | Collins et al. | 250/226 |
| 5,159,199 | 10/1992 | LaBaw | 250/339 |
| 5,164,823 | 11/1992 | Keeler | 348/144 |
| 5,173,748 | 12/1992 | Bilhorn | 356/328 |
| 5,247,356 | 9/1993 | Ciampa | 348/135 |
| 5,267,042 | 11/1993 | Tsuchiya et al. | 348/144 |
| 5,276,321 | 1/1994 | Chang et al. | 250/266 |
| 5,296,926 | 3/1994 | Nagura | 348/144 |
| 5,354,980 | 10/1994 | Rappoport et al. | 250/208 |
| 5,371,358 | 12/1994 | Chang et al. | 250/226 |
| 5,402,227 | 3/1995 | Schuma | 356/328 |
| 5,555,018 | 9/1996 | Von Braun | 348/144 |

OTHER PUBLICATIONS

"The Conception, Design and Airborne Test of a Variable Interference Filter Imaging Spectrometer System," X. Sun, Thesis Presented University of Dundee, United Kingdom, Feb. 8, 1993, p. i–25 Scotland.

"Development of Real-Time Software for A Variable Interference Filter Imaging Spectrometer", Sep. 15–17, 1992, Scotland, Sun & Anderson, Dundee, UK, pp. 1–10.

"Pushbroom Queue Processing For Three-Dimensional Remote Sensing Using a Transputer Based Frame Grabber Module," Sun & Anderson, Dundee, UK, pp. 161–167, (Scotland), Aug. 1991.

International Airborne Remote Sensing Conference and Exhibition, Sun & Anderson, Strasbourg, France, vol. II, Sep. 12–15, 1994, pp. II–178–II–191, entitled "An Easily Deployable, Miniature, Airborne Imaging Spectrometer".

"A Spectrally-Filtered Airborne Video System and Its Imagery," Sun, Baker and Hordon, Flight Landata, Inc., 15th Biennial Work-shop on Color Photography and Videogra

(List continued on next page.)

*Primary Examiner*—Howard W. Britton
*Assistant Examiner*—Vu Le
*Attorney, Agent, or Firm*—Pearson & Pearson

[57] ABSTRACT

A spectrally-filtered, miniature, imaging spectrometer system for airborne remote sensing data acquisition with a two dimensional field of view. Synchronized CCD-imager sensor modules or cameras are aligned to a common field of view. One sensor module has a visible range variable interference filter on its surface and a second module has a near-infrared range variable interference filter on its surface. Video data from the three sensor modules is combined and recorded on a single analog or digital recorder. Futher, such video data is monitored by a computer and used to control the shutter speed of each of the three sensor modules. Wavelength spectral image data and directional spectral image data are acquired by a single pass over a target area. Post-processing of such data produces reconstructed track-recovery-images extracted from a sequence of video frames for the spectral regions of interest at a fixed column position to produce multiple bands of monochrome images.

30 Claims, 8 Drawing Sheets

OTHER PUBLICATIONS

"A Spectrally–Filtered Airborne Video System and Its Imagery," Sun, Baker and Hordon, Flight Landata, Inc., 15th Biennial Work–shop on Color Photography and Videography in Resource Assessment, Indiana State Univesity, Terre Haute, Indiana, pp. 1–9.

"Wedge Imaging Spectrometer (WIS): Hyperspectral Data Exploitation", L.M. Woody, Presented at the First International Airborne Remote Sensing Conference and Exhibition, Strasbourg, France, Sep. 11–15, 1994, pp. II–630–II–641.

"New Sensor Technology for Acquiring Hyperspectral Imagery," J. G. Thunen, L. M. Woody, Presented at the First International Airborne Remote Sensing Conference and Exhibition, Strasbourg, France, Sep. 11–15, 1994, pp. II–322 to II–331.

Needs and Solutions for Pollutioin Monitoring Control, and Abasement, vol. 1, Proceedings of the First Thematic Conference, Remote Sensing for Marine and Coastal Environments, New Orleans, Louisiana, USA, SPIE vol. 1930, Jun. 15–17, 1992, pp. 1063–1076.

Remote Sensing for Marine and Coastal Environments, Needs, Solutions and Applications, vol. II, Proceedings of the Second Thematic Conference, Jan. 31–Feb. 2, 1994, New Orleans, LA, pp. xxi–II–506 to II–517.

COMPUTER CONTROLLED, 3-CCD CAMERA, AIRBORNE, VARIABLE INTERFERENCE FILTER IMAGING SPECTROMETER SYSTEM

BACKGROUND OF THE INVENTION

This invention relates to an imaging spectrometer system and more particularly, to a variable interference filter imaging spectrometer system for acquiring ground track images from air or space platforms.

Over the past decade, imaging spectrometry has been emerging as a new remote sensing tool following advances in multispectral imaging technology. Imaging spectrometry, which consists of the acquisition of images in many narrow, contiguous spectral bands, offers considerable advantages over traditional multispectral scanner imaging for remote sensing in terms of high resolution in spatial, spectral, and radiometric domains. Consider the spectral domain for example. The reflected solar radiance, which carries the spectral characteristics of the remotely sensed targets on the earth surface, used to be undersampled (with only a few discrete measurement bands) by multispectral scanners. For instance, a Coastal Zone Colour Scanner (CZCS) in the NIMBUS-7 satellite (1978–1986) has four visible bands at 433, 520, 550 and 670 nm with 20 nm half-width and a Thematic Mapper (TM) of Landsat supplies only six broad spectral bands of images with large gaps over the solar reflected spectral range 0.4 to 2.5 mm. Imaging spectrometers are designed to provide contiguous spectral sampling over the measurement range.

Imaging spectrometry results in hyperspectral image data set (Geotz et al. 1985). By contiguous high-resolution spectral-imaging sampling, the data yielded from the imaging spectrometry approach will increase by over an order of magnitude over the current multispectral scanner data in the same spectral region.

In the prior art an airborne multiband imaging spectrometer is described in U.S. Pat. No. 5,149,959, issued Sep. 22, 1992 to William E. Collins, et al. and assigned to Geophysical & Environmental Research Corporation of New York. The Collins et al. spectrometer is basically a whiskbroom imaging spectrometer. In the most basic whiskbroom approach, a rotating mirror scans the ground crosswise to the path of the airplane. The crosswise data is picked up pixel by pixel. The image is skewed, compared to a photographic image because the crosstrack pixels are not in a line; the later-recorded pixels are further along the ground than the earlier-recorded pixels. The basic whiskbroom approach is used for satellite sensing but is not suited for airborne sensing because of this skewing. However, Collins et al. improve on the basic whiskbroom approach by using a rotating polygon mirror to scan the ground four times per revolution, allowing a factor of four reduction of rotation speed to scan speed. The spectrometer comprises a beam splitter that divides the light into two (or more) beams or so called contiguous bands. Then two (or more) beams are directed to two (or more) diffraction gratings and then to detectors. Each of the detectors is comprised as a line array for each diffraction grating. The detector output is sent to a signal processor, which is chiefly a normal analogue to a digital (A/D) converter. The output data is converted for recording and real time display. However, whiskbroom imaging spectrometers are big and heavy, perhaps 200 kilograms for a typical unit, and mechanically complex. Also, the images are not the same as photographs and there may be skewing.

In U.S. Pat. No. 5,276,321, issued Jan. 4, 1994 to Sheng-Huel Chang et al. and assigned to Geophysical & Environmental Research Corporation, a multi-channel imaging spectrometer for airborne geological surveys and environmental surveys in a moving vehicle similar to U.S. Pat. No. 5,149,959 is described. It comprises an optical scanner employing a rotating polygon scan mirror which achieves a wide lateral field of view in what is known as whiskbroom mode of operation. The energy scanned is directed by a Kennedy scanner to a parabolic mirror and then fed to a plurality of spectrometers. A further improvement provides another mode of operation, known as the "pushbroom" or "staring" mode which utilizes a fixed mirror centered on the nadir and utilizes the motions of the vehicle to scan the scene. In a further improvement, the scene is scanned by the rotating mirror and the image is sequentially applied to a two-dimensional array so as to generate a continuous three-dimensional spectral display. However, this invention employs a complicated rotation polygon as a simple mirror in the pushbroom imaging mode.

A dispersion component-based imaging spectrometer has a one dimensional view. Its dispersed two-dimensional imagery gives no information about a geometric view of the ground track. A band switching video (using a filter wheel or a tuneable filter) imagery sequence is never visually comfortable to a user because of periodic flickering caused by the periodic band changing. In the traditional one-dimensional field of view imaging spectrometers, as described above in U.S. Pat. No. 5,276,021, they are not able to provide directional spectral images.

A wedge image spectrometer (WIS) for collecting imagery is described in a paper by J. G. Thunew and L. M. Woody entitled, "New Sensor Technology for Acquiring Hyperspectral Imagery," First International Airborne Remote Sensing Conference and Exhibition, Strasbourg, France, 11–15, September 1994. The WIS comprises a linear spectral wedge filter with tapered layers. It is a thin-film optical filter that transmits light at a center wavelength that depends on the spatial position of the illumination. If an array of detectors is placed behind the device, each detector now will receive light from the scene at a different center frequency and the array output is the sampled spectrum of the scene. By mating the wedge filter to an area array, the scene information was claimed to vary spatially in one direction and spectrally in the other (Thunew and Woody, 1994). Moving the assembly perpendicular to the spatial dimension builds a two-dimensional spatial image in each of the spectral bands. Another version of the WIS is implemented with a mosaicized filter which comprises two filters with each filter covering less than a spectral octave. However, the actual two dimensional field of view nature of this sort of imaging spectrometer using one area sensor, has associated with it the difficulty of separating the angular effects introduced by the two-dimensional field of view observation. It cannot separate and measure the directional effect. Moreover, it could be hard to focus both the blue light such as at 400 nm, and the near infrared light such as at 1050 nm onto a single focal plane of sensor.

An imaging spectrometer, comprising imaging optics, a spectrometer module and a sensor, is a physical instrument for realizing the imaging spectrometry concept. It can be categorized by the type of the spectrometer adopted. Traditionally a light dispersion spectrometer is employed in an imaging spectrometer design using a grating or prism as the dispersing element. Later, the light-frequency-spatially-selecting spectroscopy concept was developed by the present inventor at University of Dundee, of Dundee Scotland, to construct a spatially linear variable interference filter based imaging spectroscopy instrument (VIFIS) as described in a paper by X. Sun and J. M. Anderson, "A Light-Frequency-Spatially-Selecting Component Based Airborne Pushbroom Imaging Spectrometer for the Water Environment", Proceedings of the First Thematic Conference on Remote Sensing for Marine and Coastal Environments, SPIE Volume 1930, New Orleans, La., p. 1063–1076, 1992. It is simple and compact in structure with advantages in easy deployment, two-dimensional field of view, the same ray geometry to a normal video camera, better picture quality, and application flexibility. However, analog video recording techniques were employed resulting in less than desireable picture quality.

The first two dispersion imaging spectrometers were tested in the early 1980s. They are the airborne imaging spectrometer (AIS) by Jet Propulsion Laboratory (JPL) (Vane, et al. by Moniteq Ltd. of Toronto (Gower et al. 1985). The first airborne single camera variable filter imaging spectrometer was tested in 1991 (see above, Sun and Anderson 1992).

However, the spectral track-recovery-images of VIFIS are three-parameter spectral images dispersed along the correlated wavelength, direction and time-delay parameters. Its pixel spectrum is progressively scanned rather than simultaneously captured and may be subject to the influence of different viewing angles. The present invention is the further improvement of VIFIS using three camera modules with an airborne digital recorder and measures the cleaned wavelength effects and directional effects with three planes simultaneously captured.

SUMMARY OF THE INVENTION

Accordingly, it is therefore an object of this invention to provide a miniature imaging spectrometer system for airborne remote sensing data acquisition.

It is another object of this invention to provide a modified CCD video imager having a detector array that is spectrally filtered by an attached linear variable interference filter.

It is another object of this invention to provide an imaging spectrometer system for acquiring both wavelength spectral image data and directional spectral image data.

It is a further object of this invention to provide a spectrally filtered imaging system having three synchronized CCD-imager modules or cameras aligned to a common field of view for acquiring wavelength spectral image data and directional spectral image data with a single pass over a target area, each of said cameras having its shutter speed under program control and recorded.

It is a further object of this invention to obtain the spectrally filtered video data from three synchronized CCD-imager modules or cameras wherein a first one of the cameras comprises a visible-range variable interference filter, a second one of the cameras comprises a near-infrared range variable interference filter and a third one of the cameras has no variable interference filter.

It is a further object of this invention to provide a miniature imaging spectrometer system having three synchronized CCD-image modules or cameras wherein the video outputs of the cameras are combined and stored on one recording device.

It is a further object of this invention to provide a miniature imaging spectrometer system for providing spectrally-filtered airborne videography and processed spectral track-recovery images produced from the original recorded spectrally-filtered video data by post-flight computer processing.

These and other objects are met by an imaging spectrometer system comprising means having at least one variable interference filter for acquiring spectral images over a predetermined spectral range, means positioned adjacent to the spectral images acquiring means for acquiring video graphic images, means for synchronizing the spectral images acquiring means and the video graphic images acquiring means to enable acquiring the spectral images and the video graphic images simultaneously, means coupled to outputs of the spectral images acquiring means and the video graphic images acquiring means for conditioning the outputs for recording and processing, and means coupled to said spectral images acquiring means and said video graphic acquiring means for controlling a shutter speed of the spectral images acquiring means and the video graphic images acquiring means. The variable interference filter acquires spectral images over the predetermined spectral range including a visible spectral range and a near-infrared spectral range. The spectral images acquiring means comprises the variable interference filter positioned contiguous to a CCD sensor. The spectral images acquiring means and the video graphic acquiring means are aligned to a common field of view. The video graphic images from the video graphic acquiring means are used to obtain directional spectral data. The directional spectral data obtained from the video graphics acquiring means corrects the spectral images from the spectral images acquiring means by removing slant errors from the spectral images. The means for controlling a shutter speed of the spectral images acquiring means and the video graphics acquiring means including monitoring said outputs by said conditioning means to control the spectral intensity impinging on a CCD of said spectral images acquiring means and said video graphic images acquiring means. The conditioning means further comprises means for generating global positioning system information. The conditioning means further comprises means for converting the outputs to a single composite video signal for recording on an analog video recorder, for digitizing the outputs to enable storing the outputs in a digital format, and comprises computer means for controlling the conditioning of the outputs from the spectral images acquiring means and the video graphic images acquiring means.

The objects are further accomplished by an imaging spectrometer system comprising first camera means having a variable interference filter for acquiring spectral images in a visible spectral range, second camera means having a variable interference filter for acquiring spectral images in a near-infrared spectral range, third camera means for acquiring video graphic images, the video graphic images being used to obtain directional spectral data, means for synchronizing the first camera means, the second camera means and the third camera means to acquire the images simultaneously, the first camera means, the second camera means and the third camera means being aligned to a common field of view, means coupled to outputs of the first camera means, the second camera means and the third camera means for conditioning the outputs for recording and processing, and means coupled to the first camera means, the second camera means and the third camera means for controlling a shutter speed of the first camera means, the second camera means, and the third camera means. The conditioning means comprises means for transforming the outputs from a three-channel format to a single video signal thread. The system comprises means coupled to the conditioning means for storing the composite video signal on an analog video recorder. The system comprises means coupled to the storing means for post-processing the composite video signals. The directional spectral data obtained from the third camera means corrects the spectral images from the first camera means and the second camera means by removing slant errors from the spectral images. The conditioning means comprises a data acquisition computer means for controlling the acquisition and storage of the outputs from the first camera means, the second camera means, and the third camera means.

The objects are further accomplished by a method of providing and imaging spectrometer system comprising the steps of acquiring spectral images over a predetermined spectral range with means having at least one variable interference filter, acquiring video graphic images with means positioned adjacent to the spectral images acquiring means, synchronizing the spectral images acquiring means and the video graphic images acquiring means to enable acquiring the spectral images and the video graphic images simultaneously, conditioning outputs of the spectral images acquiring means and the video graphic images acquiring means for recording and processing the outputs with means coupled to the outputs, controlling a shutter speed of the spectral imaging acquiring means and the video graphics acquiring means. The step of acquiring spectral images over a predetermined spectral range with the variable interference filter includes the step of acquiring spectral images over a visible spectral range and a near-infrared spectral range. The step of acquiring spectral images with means having at least one variable interference filter comprises the step of positioning the filter contiguous to a CCD sensor of the acquiring means. The step of acquiring video graphic images from the video graphic acquiring means comprises the step of providing directional spectral data to correct the spectral images by removing slant errors from the spectral images. The method further comprises the step of providing global positioning system information for use with the spectral images.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
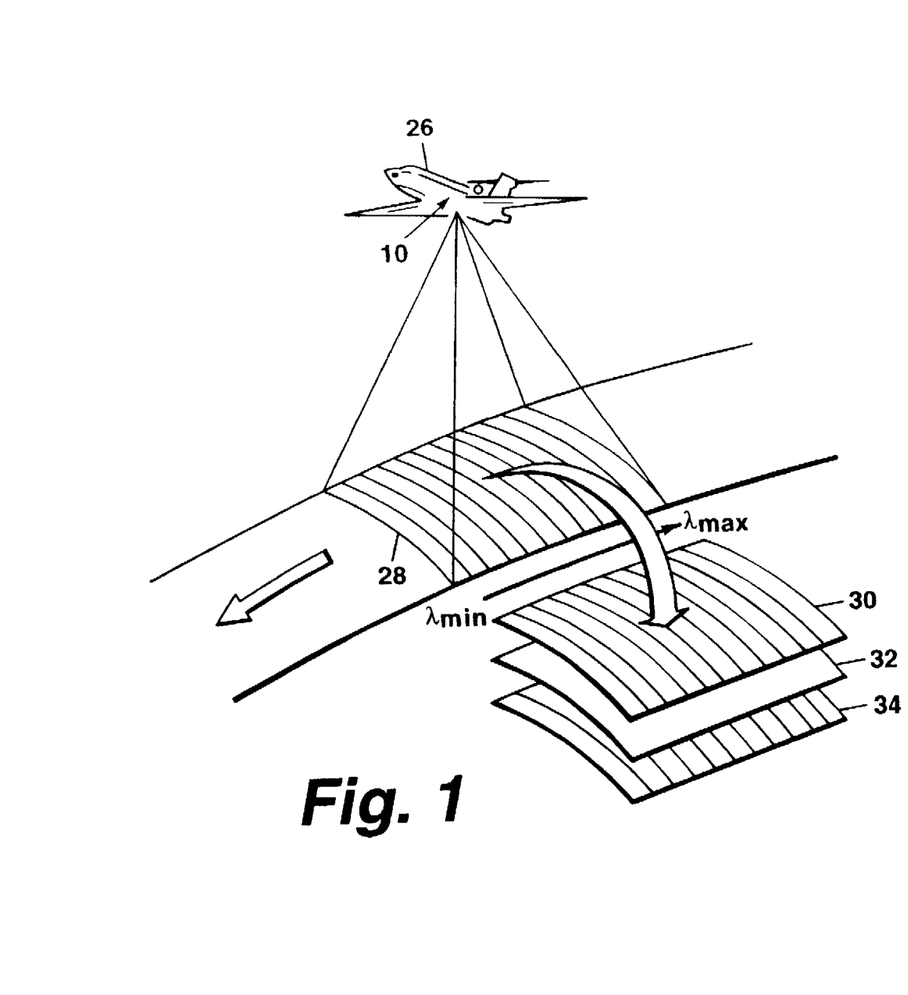
FIG. 1 is a pictorial representation of a two-dimensional field of view from an aircraft carrying a variable interference filter imaging spectrometer system showing three image planes obtained by three synchronized CCD cameras.

Referring to FIG. 1, a pictorial representation of an aircraft 26 employing the invention is shown. The invention of a variable interference filter imaging spectrometer (VIFIS) system 10 acquires ground track images 28 from air or space with a two-dimensional field of view and generates imagery from three channels of synchronized video outputs. The ground track images 28 are transformed into a visible spectral filtering plane 30, a panchromatic plane 32 and a near infrared spectral filtering plane using three CCD sensors aligned to each other and to a common field of view. The image from the panchromatic plane 32 is useful for correcting the spectral images of planes 30, 34 by removing slant errors of different bands.

Figure 2:
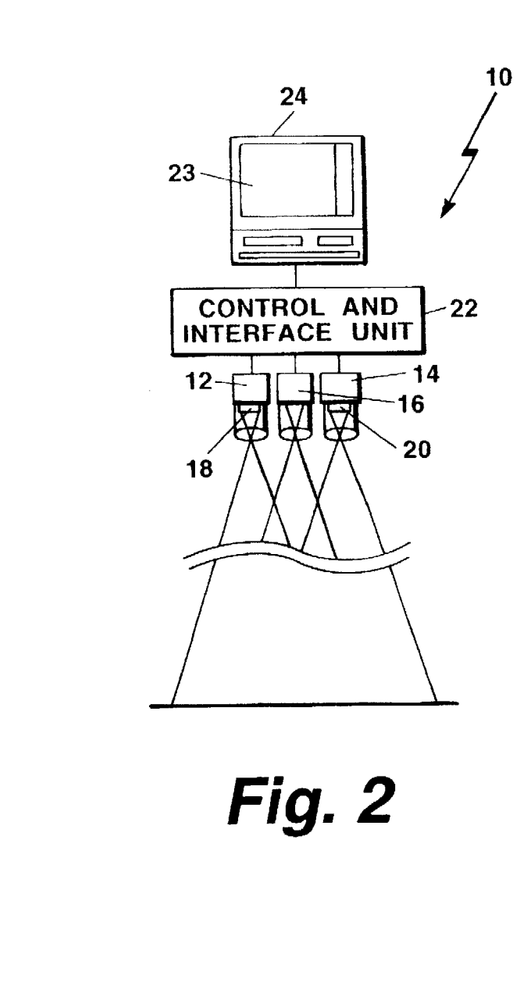
FIG. 2 is a block diagram of the variable interference filter imaging spectrometer (VIFIS) system employed in FIG. 1.
Figure 4:
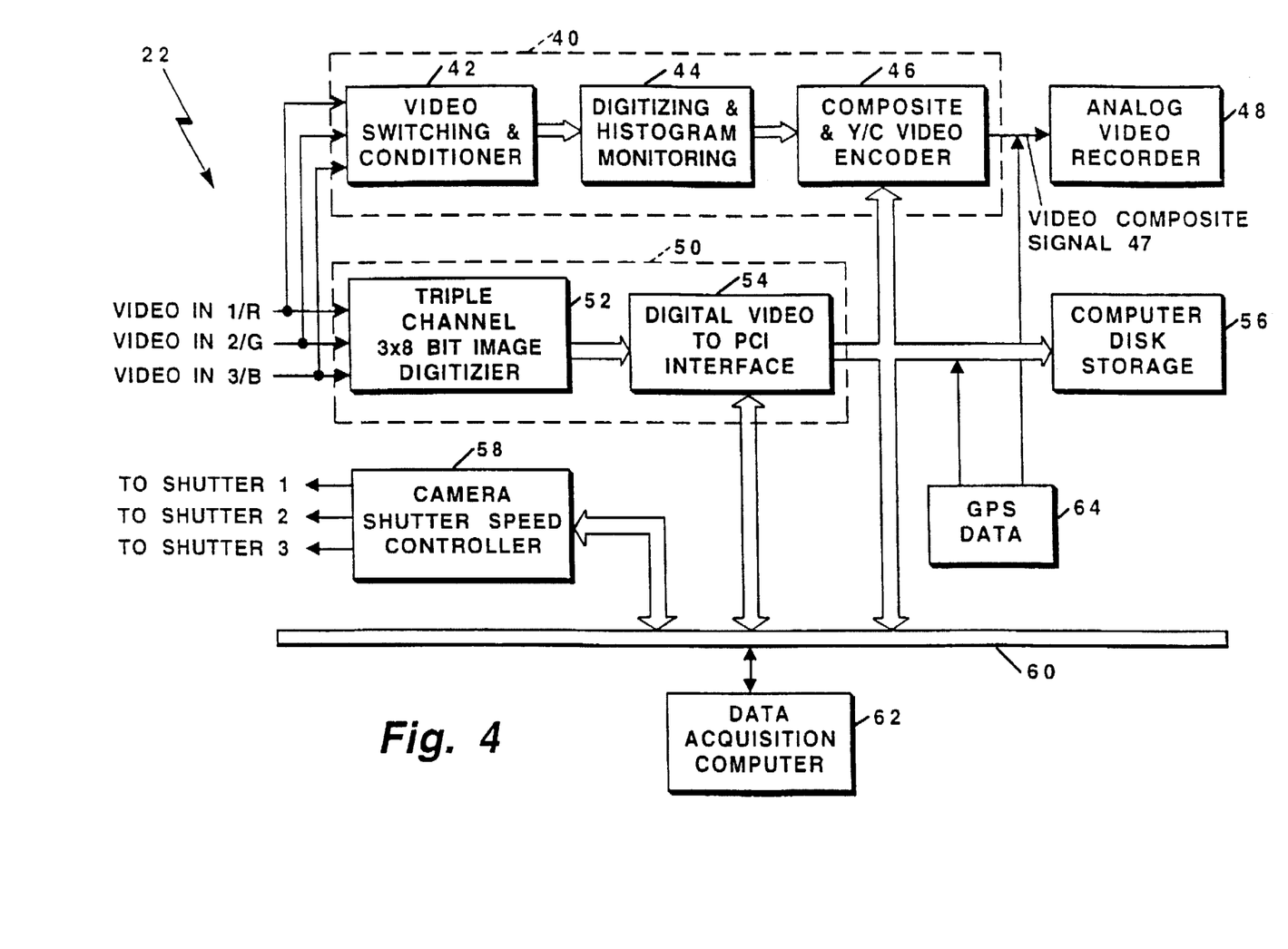
FIG. 4 is a block diagram of a control and interface unit of the invention.

Referring to FIG. 2, a block diagram of the variable interference filter imaging spectrometer (VIFIS) system 10 is shown comprising the three synchronized CCD-imager modules or cameras 12, 14, 16, aligned to each other and to a common field of view. The synchronized output video signal from each camera is fed to a control and interface unit 22 where such signals are treated as a format of a standard RGB video signal for ease of data handling. The control and interface unit 22 generates a composite analog signal for recording on an analog video recorder and also generates a digital signal for recording on a computer disk system or other digital recording apparatus. The control and interface unit 22 also controls the shutter speed of each of the cameras 12, 14, 16. The video signals from the control and interface unit 22 are fed to a monitoring and recording device 24 where the images obtained may be viewed on a video monitor 23 and/or recorded by a single analog video recorder 48 or digital disk 56 for further usage and processing as shown in FIG. 4. One of the cameras 12 comprises a near-infrared range variable interference filter 18 fitted to the sensor surface of the camera and covers the range of 620 nm ($\lambda_{MIN}$) to 890 nm ($\lambda_{MAX}$). Camera 16 comprises a visible-range variable interference filter fitted to the sensor surface of the camera and covers the range of 440 nm ($\lambda_{MIN}$) to 640 nm ($\lambda_{MAX}$). The third camera 14 is a normal panchromatic CCD video camera which can be attached with a normal bandpass filter if required. This arrangement of the three cameras 12, 14, 16 as shown in FIG. 2 permits the acquiring of both wavelength spectral image data and directional spectral image data by a single pass of the cameras over a target area without confusing wavelength and directional effects. Other advantages result such as video spectral coverage, flatter spectral response and more accurate focus from the use of the two separate filters. Table 1 lists the specifications for the VIFIS system 10.

TABLE 1

Base Camera Module: Sony CCD-XC75CE
 Effective pixel: 752×582
 Video S/N ratio 54 dB
 Weight: 140 g
 Power: +12 DC/1.6 W
 Lens mount: C mount
 Typical Total Field of View (using 8.5 mm lens): 31.4 degrees Typical Field of View (using 8.5 mm lens): 0.98 mrad
Typical Spatial Resolution (using 8.5 mm lens): 1 foot at 1000 feet
Typical Spectral Range:
  Module one: 440 nm–640 nm
  Module two: 620 nm–890 nm
  Module three: bandpass filter
Spectral Resolution: 2% at passband
Typical Data Recording Rate:
  To tape: 25 frame/sec (CCIR video rate, 3 channel alternately switchable)
  To WIDE SCSI hard disk: up to 1215 frame/sec
Airborne Computer: PCI Bus Personal Computer
Operating System: Microsoft Windows 3.1

Figure 3:
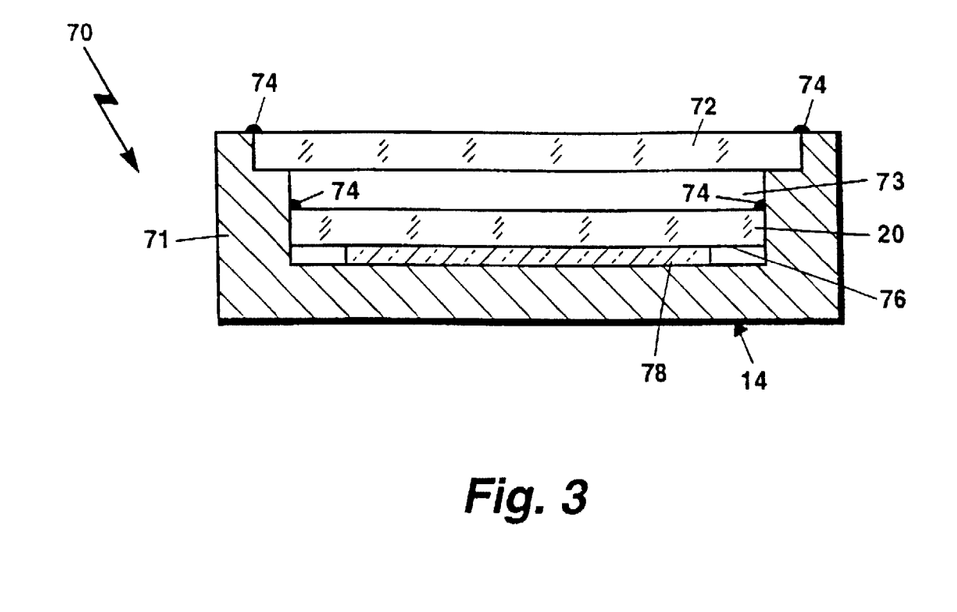
FIG. 3 shows a cross-section of a CCD imager assembly and the positioning of a variable interference filter.

Referring now to FIG. 3, a cross-section is shown of camera 14 assembly comprising the variable interference filter 20 attached to a silicon CCD sensor 78 of the CCD imager or camera 14. The outer surface of the camera assembly 14 comprises a blocking filter glass window 72. This window 72 is removed for insertion of the variable interference filter 20. A silicon CCD sensor 78 is positioned adjacent to the inside surface of a mounting base 71 of the camera assembly 14. Above the silicon CCD sensor 78 is positioned the glass substrate of the variable interference filter 20 having a coated surface 76 facing the sensor 78. Such filter 20 is cut to size to fit over the silicon CCD sensor 78. There is an air space 73 between the variable interference filter 20 and the blocking filter glass window 72. A spectrum light source is used to align the variable interference filter 20 and the silicon CCD sensor 78. When such aligning is completed, an ultraviolet (UV) curing optical adhesive 74 is used to cement the variable interference filter 20 at the inner sides of the mounting base 71. After the VIF 20 has been positioned, aligned, and cemented in the camera assembly 14, the blocking filter glass window 72 is positioned and cemented to the inner sides of the camera assembly 14 using the UV curing optical adhesive 74. The variable interference filters 18, 20 may be embodied by Model LVF 400-700 and LVF 600-1100 manufactured by Optical Coating Laboratory, Inc. of Santa Rosa, Calif. The optical adhesive 74 may be embodied by Tyne NOA-61 manufactured by Norland Products, Inc. of North Brunswick, N.J.

Referring now to FIG. 4, a block diagram of the control and interface unit 22 is shown which performs several functions. The three video outputs from camera 12, 14, 16, which are identified in FIG. 4 as video IN 1/R, video IN 2/G and video IN 3/B, are fed to a first electronic card 40 for converting or conditioning these signals to a composite analog video signal. The three video IN signals are fed to a video switching and conditioner 42 which prepares the video signals for transfer to a digitizing and histogram monitor 44. The digitizing and histogram monitoring unit provides for monitoring of the signal intensity. The digitizing data stream is sent to a composite and Y/C video encoder 46 which generates an analog composite signal of the three video IN signals which may be recorded on a single analog video recorder 48 using a S-VHS tape. The advantage of this recording mode is the amount of information that can be recorded which, depending on the length of tape used, could be up to four hours of recording time. This first electronic card may be embodied by a Marvel II Card with a video encoder manufactured by MATROX Electronic Systems, Ltd., of Quebec, Canada.

The three video signals, video IN 1/R, video IN 2/G and video IN 3/B, are also fed to a second electronic card 50 for converting or conditioning such signals into a digital format for recording directly to a hard disk storage 56. These video signals are fed to a triple channel 3×8-bit image digitizer 52 which generates digital video data. This digital video data is fed to a PCI interface 54 circuit for preparing the digital signals for transfer to a peripheral communication interface (PCI) bus which is coupled to a disk storage device 56 which functions as a digital video recorder. Two disks of 4 gigabytes each, for example, have a continuous recording time of 25–30 minutes which is sufficient for demonstration purposes. The second electronic card 50 may be embodied by a Meteor card manufactured by MATROX Electronic Systems, LTD., of Quebec, Canada. A third function of the control and interface unit 22 is accomplished by a camera shutter speed controller 58 under the control of a data acquisition computer 62. The camera shutter speed controller 58 may be embodied by a Data Raptor Card manufactured by Bitflow, Inc., of Woburn, Mass. The data acquisition computer 62 may be embodied by a 100 MHz Tritton Chip Set, Model PCI/I-P54TP4, manufactured by Asustek Computer, Inc., GPS (Global Positioning System) data may be added to the digital video signal stream output by the second electronic card 50. The GPS data 64 provider may be embodied by Model XT Oncore manufactured by Motorola, of North Brook, Ill.

Referring to FIG. 4, a significant feature of the present embodiment is the camera shutter speed controller 58. By controlling the shutter speed, the exposure status of the camera can be controlled and recorded by the computer 62. Not only does this ensure the most optimum exposure, but it also enables radiometric calibration to be performed with the recorded exposure status. Such calibration is important to remote sensing applications.

Figure 5:
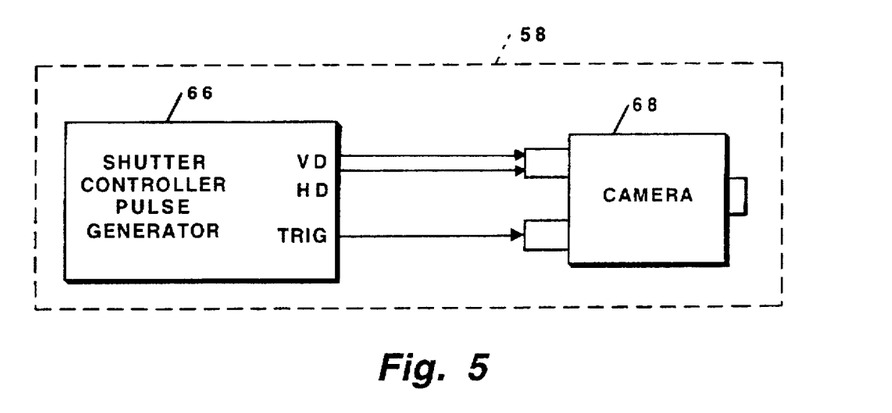
FIG. 5 is a block diagram showing a pulse generator generating shutter control timing signals.
Figure 6:
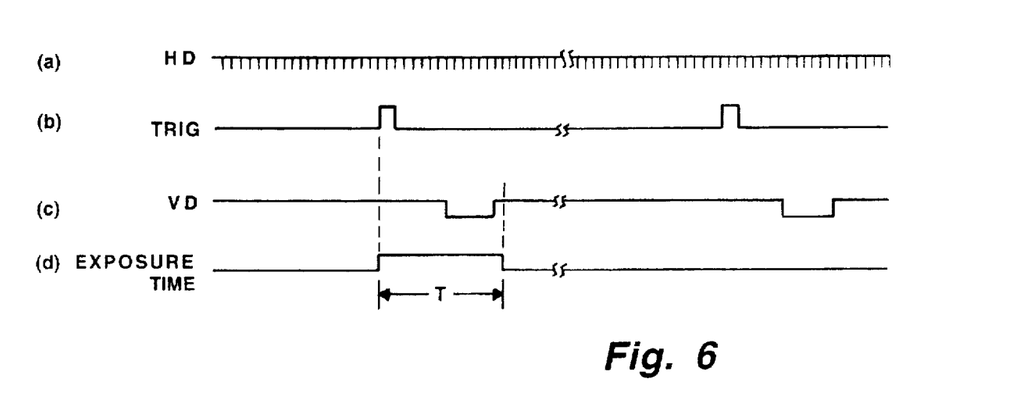
FIG. 6 is a timing diagram of the shutter control timing signals VD, HD and TRIG which generate exposure time.
Figure 7:
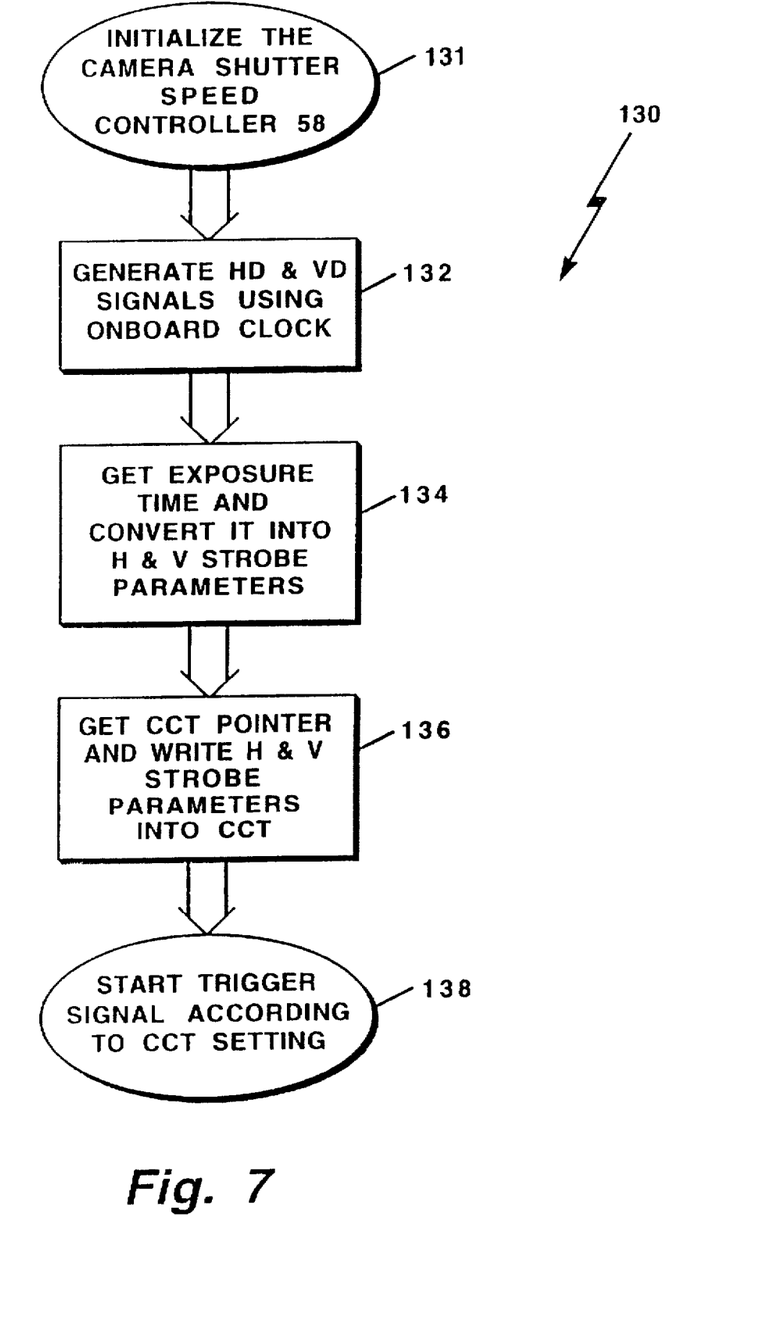
FIG. 7 is a flow chart of the shutter speed control software program.

Referring now to FIGS. 5–7, the VIFIS cameras 12, 14, 16 can be operated under S-DONPISHA shutter control mode in conjunction with the camera shutter speed controller 58 and appropriate software (described hereinafter). FIG. 5 shows a pulse generator 66 for generating HD, VD and TRIG pulses required for shutter control. FIG. 6 is a timing diagram showing the relative timing of the HD, VD and TRIG pulses. The shutter exposure time (T) is determined by the phase shift between the shutter trigger pulse (TRIG) and the VD pulse. The leading edge of the trigger pulse is usually in front of the trailing edge of the VD pulse. The HD and VD pulses are external synchronization signals under either CCIR (European, China) or RS170 (United States, Japan) video scanning standards. The TRIG pulse has the same frequency as the VD pulse but different phase. The frequency (period) parameters of the three pulses for two types of cameras 12, 14, 16, SONY CCIR and RS170, are listed in Table 2:

TABLE 2

| SIGNAL | CCIR CAMERA | RS170 CAMERA |
| --- | --- | --- |
| HD | 15.625 KHz ± 1% | 15,734 KHz ± 1% |
|  | (64 µs ± 1%) | (63.56 µs ± 1%) |
| VD | 50 Hz (312½ H, | 59.936 Hz (262½ H, |
|  | 1H = 64 µs) | 1H = 63.56 µs |
| TRIG | 50 Hz | 59.936 Hz |
| Shutter Exposure Time | 2 µs to 13 ms | 2 µ to 13 ms |
| Shutter Speed | 1/500,000 to 1/77 sec | 1/500,000 to 1/77 sec |

Referring now to FIG. 7, a flow chart of the shutter speed control software program 130 is shown. First the program 130 initializes the camera shutter speed controller 58 by setting up a working environment required by the camera shutter speed controller 58 and in particular the Data Raptor Card manufactured by Bitflow, Inc. After initialization, the program causes an internal clock to generate either a 15 MHz pixel clock for the CCIR camera or a 12.58 MHz clock for the RS170 camera. An on-board differential drive outputs the clocks to a TTL level. Hence, the cameras are locked to the internal clock and the HD and VD signals are generated. Next, the software 130 obtains an input exposure time from either a preset or a computer determined exposure time according to the signal level of the digital video, and converts it into HSTROBE and VSTROBE parameters required by an HCTAB (Horizontal Control Table) and VCTAB (Vertical Control Table) respectively. The two parameters determine a precise point of trigger signal in time to generate VD signal (STROBE=VSTROBE * HSTROBE, where * is a logical AND). Next, the program 130 gets a camera control table (CCT) pointer that is used to directly access the camera control table register (not shown) which stores the strobe timing. The HSTROBE and VSTROBE parameters are downloaded into the camera control table. Next the program 130 generates the trigger (TRIG) signal in accordance with the CCT settings. The trigger starts a trigger pulse which switches the electronic drain for every photosite on a CCD. When the drain is on, the photo-electrons are drained and cannot be accumulated. Such an electronic shutter on a CCD is equivalent to an optical shutter in a lens.

The control for the cameras (CCIR or RS170) is implemented with two general purpose static RAMs: one for the horizontal axis called the horizontal control table, the other for the vertical axis called the vertical control table. The size of these memories are 8K×8-bits. In those tables are programmed the position and size of various control signals. The HCTAB is addressed by a counter clocked by ¼ of the horizontal pixel clock. The horizontal control signals' resolution is on a four pixel boundary. The CCT (HCTAB and VCTAB) are programmed from the data acquisition computer 62.

Software is provided in the data acquisition computer 62 for controlling the functions performed by the control and interface unit 22. The software for the first electronic card (or Marvel II Card) 40 performs video switching functions to enable three channels of video input to be recorded on one analog video recorder 48. Software for the second electronic card (or Meteor Card) 50 performs two major functions; (a), it provides for direct recording of contiguous frames into a main memory of the data acquisition computer system 62 at full resolution and full frame rate and then transfers that data into a computer hard disk 56; and (b), it provides for directly recording of contiguous frames into a disk array (not shown) comprising 2-4 disks using a SCSI-realized sequencer and internal caches of the hard disks (in this mode main memory is bypassed thereby avoiding the size limitations of main memory). Software for the camera shutter speed controller (or Data Raptor card) 58 produces control signals to control the shutter speed of the cameras 12, 14, 16. The above software is readily programmed by one of ordinary skill in the art.

The spectrally-filtered imaging system 10 provides the following two classes of spectral image data: first, the spectrally filtered airborne videography (the raw data) and second, processed spectral track-recovery-images produced from the original spectrally-filter (i.e., variable interference filter) data. These images are what are seen in the video monitor 23 during the data collection and post-flight replay. With a two-dimensional photographic projection and fast shuttering, these images have the advantage of freezing the motion and are of course almost free from geometric distortion.

The main advantage of having the raw data is that all frequencies are present in each image. The second class of system output consists of a bandset of the reconstructed track-recovery-images, each of which is monochromatic and mosaicized from the segment of the original spectrally filtered video sequence of video frames at a fixed column position using a pushbroom queue processing principle which is described by X. Sun and J. M. Anderson in the paper entitled "Pushbroom Queue Processing For Three-dimensional Remote Sensing Using A Transputer Based Frame Grabber Module," Proceedings of the Third International Conference on Applications of Transputers, Glasgow, pp. 160–167, 28–30 Aug. 1991. Such a bandset can be interactively and flexibly produced as either the wavelength spectral image or the directional spectral images depending on the computing algorithms. The spatial resolution and size of the bandset can also be interactively and flexibly resampled to meet user-specific applications.

Figure 8:
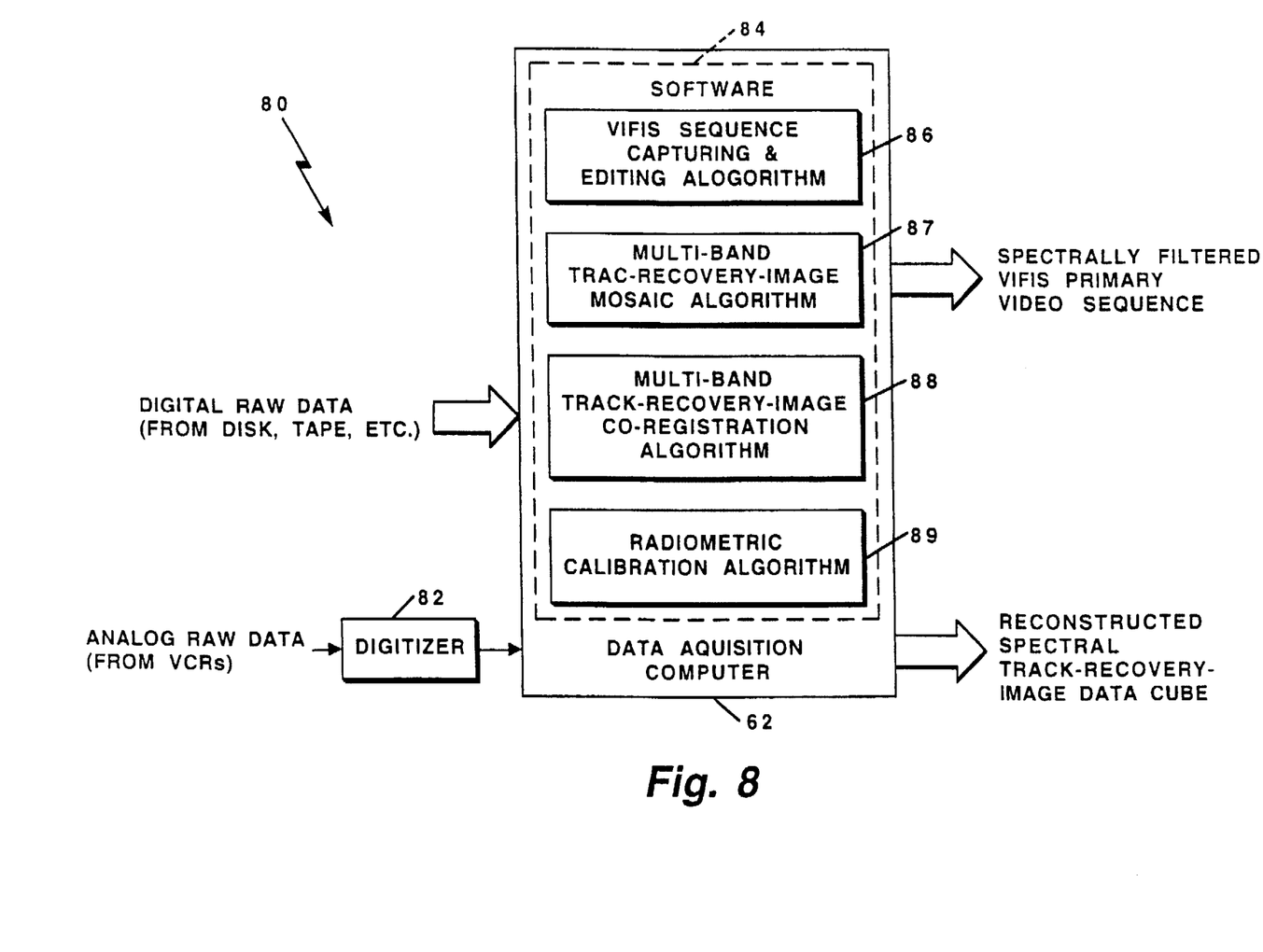
FIG. 8 is a block diagram of a post-processing system for the VIFIS system.

Referring now to FIG. 8, a block diagram of a post-processing system 80 for the VIFIS system 10 is shown. The post-processing system 80 is used to produce the spectrally filtered VIFIS primary video sequence images and reconstructed spectral track-recovery-image data images from two sources of raw data, i.e., digital raw data and analog raw data. The post-processing system comprises a digitizer 82 coupled to the data acquisition computer 62. The digitizer 82 converts analog raw data from a VCR tape to digital format that can be processed by computer 62. Digital raw data from disks, tapes, main memory, etc., is fed directly into the computer 62. Software 84 stored in the computer 62 performs the post-processing on the digital raw data and the analog raw data using C/C++ language. The software 84 comprises the following program modules:

(a) a VIFIS sequence capturing and editing algorithm 86 provides an interface to the raw data and supplies digital data to the rest of the software modules;

(b) a multi-band track-recovery-image mosaic algorithm 87 recognizes the data from the spectral region of interest to get multiple bands of monochrome images;

(c) a multi-band track-recovering-image co-registration algorithm 88 performs band shift operations in order to get multiple bands geometrically co-registered;

(d) a radiometric calibration algorithm 89 for converting gray-level digital numbers (0–255) to spectral radiance (millimeters per square meter per unit wavelength).

Figure 9:
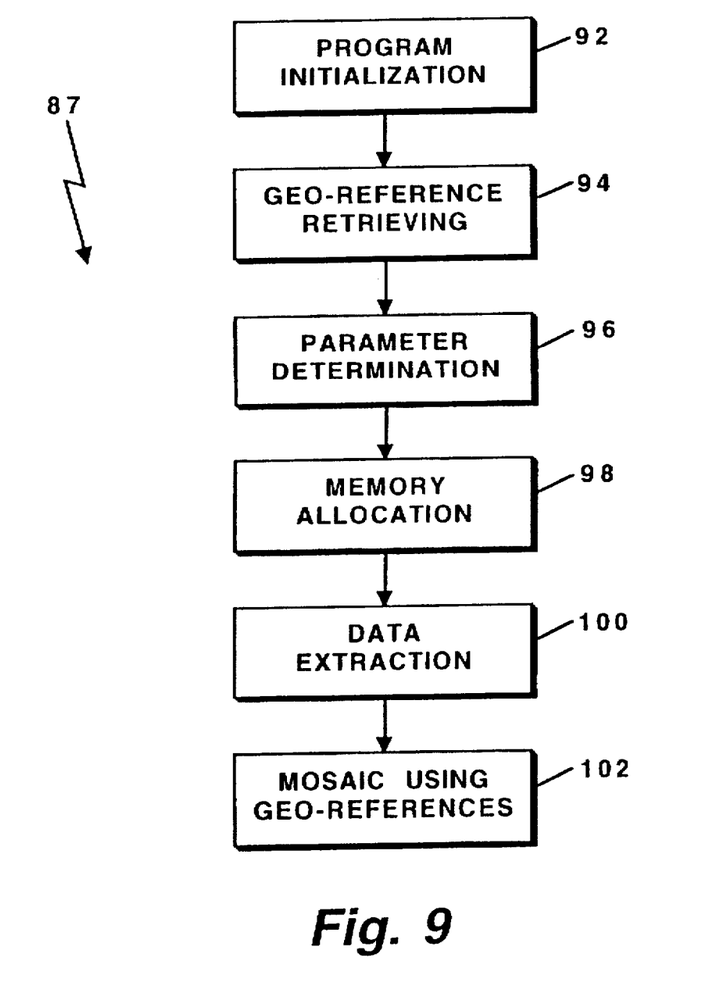
FIG. 9 is a flow chart of a multi-band track-recovery-image mosaic algorithm software program.

Referring now to FIG. 9, a flow chart is shown of the multi-band track-recovery-image mosaic algorithm 87 software program identified in FIG. 5 which recognizes the data from the spectral region of interest to get multiple bands of monochrome images. A program initialization 92 creates an application under a Window's operating environment which includes creating application windows, setting up user interfacing, and defining variables. After initialization the program proceeds to georeference retrieving 94 which retrieves stored data in accordance with longitude, latitude and altitude information contained in a GPS receiver plus the geometric information supplied by the two-dimensional photographic type of VIFIS imagery. Next, the program proceeds to parameter determination 96 where the following parameters are interactively determined by human-machine negotiation: (1) ground speed (pixel/frame time), (2) segment width of mosaic element, (3) frame-retrieving interval, and (4) pitch, row and yaw parameters. The pitch, row and yaw situation is examined visually (These parameters are not the instrument parameters available to the system so far). If the pitch, row and yaw effects are negligible, then determine (1) ground speed. Next, the program proceeds to make memory allocations 98 comprising raw data buffers and track-recovery-image buffers. The program then proceeds to perform data extraction 100 where multiple bands of data are extracted from regions of interest of the original VIFIS frames to the memory buffers. Next, mosaic using georeferences 102 is performed by generating multi-spectral track-recovery-images using either GPS information or a pattern matching algorithm.

Figure 10:
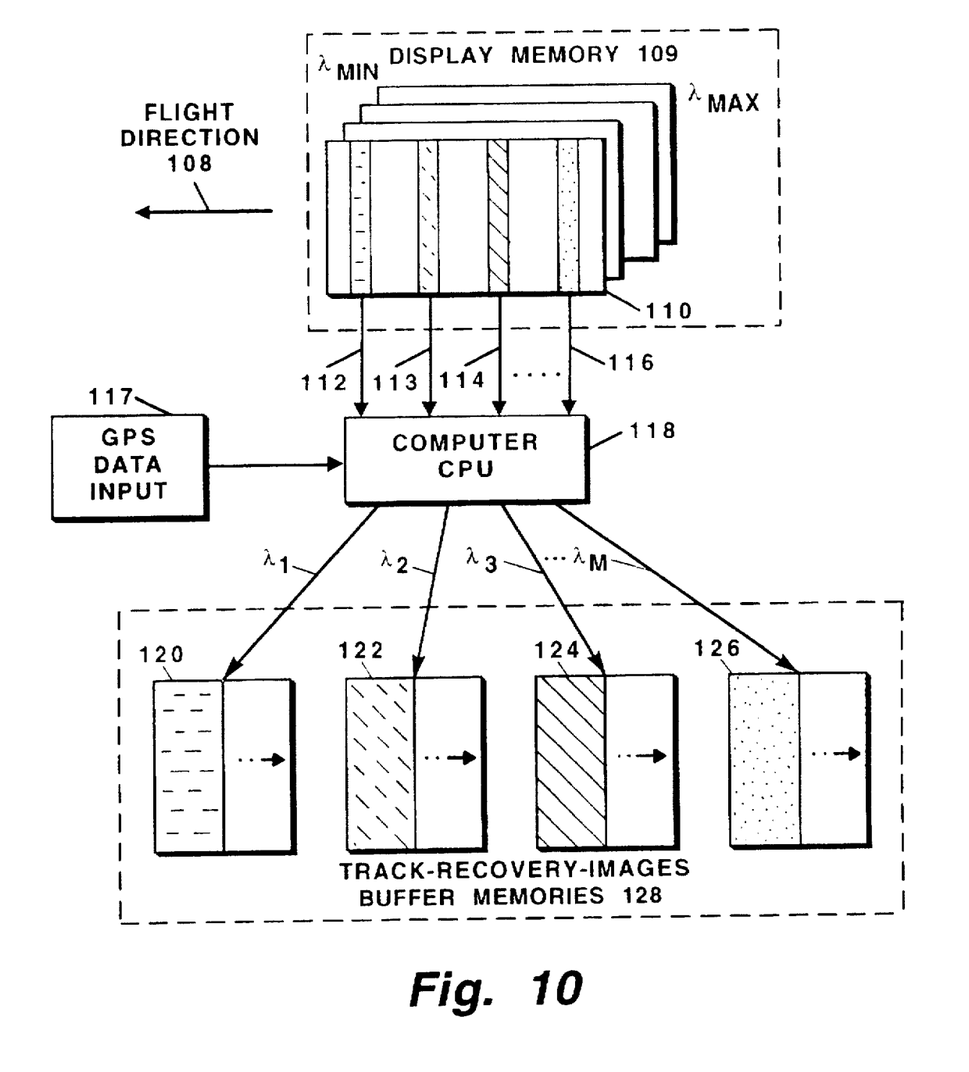
FIG. 10 is a pictorial representation of the operation of the multi-band track-recovery-image mosaic algorithm software program.

Referring now to FIG. 10, a pictorial representation of several bands 112, 113, 114, 116 of the track-recovery-images being produced from a sequence of the raw spectral image data from image planes 30 and 32 in FIG. 1 in the range λmin–λmax that the VIFIS system 10 collects during a flight pass over a target area. During the post-processing, the recorded video sequence, from either video tape or computer disk, replays on a desktop computer/monitor 118. When the replayed video sequence is refreshed in a display memory buffer 110 selected data in the marked columns 112, 113, 114, 116 in FIG. 7 are copied and appended to the several track-recovery-images buffer memories 128. This algorithm is now implemented using a computer CPU 118 when data play back occurs from the computer disk.

Referring again to FIG. 10, several bands 112, 113, 114, .... 116 of the track-recovery-images can be produced from a sequence of the raw panchromatic (or monochromic) images from the image plane 32 of FIG. 1. Because these bands of the track-recovery-images result from the same wavelength range of the reflected solar illumination (assuming the illumination condition remains the same during the aircraft's flying over), the variation among these bands is produced by the viewing angle changes. Therefore, these bands of track-recovery-images are called directional spectral images. These directional spectral images can be used to remove the viewing angle effects (slant errors) associated with the wavelength spectral images (from planes 30 and 34).

It has been theoretically resolved that there are three and only three possible ways to acquire three-dimensional, linear hyperspectral image cube data using a two dimensional image sensor as described in the following two papers: X. Sun and J. M. Anderson, (1992), "A Light-Frequency-Spatially-Selecting Component Based Airborne Pushbroom Imaging Spectrometer for the Water Environment," Proceedings of the First Thematic Conference on Remote Sensing for Marine and Coastal Environments, New Orleans, La., USA, SPIE Vol. 1930, pp 1063–1076, and X. Sun and J. M. Anderson, (1992), "The Sampling Principles of Imaging Spectrometry," Remote Sensing from Research to Operation/Proceedings of the 18th Annual Conference of the Remote Sensing Society, Dundee, Scotland, pp 440–449, 15–17 Sep. 1992. In addition to the spectrally filtered imaging system the other two ways use dispersion and bandpass switching technologies respectively. Although, they are all capable of hyperspectral image data acquisition, each of them has its own intrinsic features. In addition to its structure advantages of simplicity, miniaturization, flexibility in multiple sensor integration and ease of deployment, the present invention of a spectrally filtered video system 10 produces directly understandable, nice and comfortable motion video in real time.

The reflected solar radiance from the earth surface is generally affected by several factors. These include the wavelength-selective-reflectance effect and the bidirectional reflectance effect of the surface materials, the spatial and spectral distribution of the light sources, and the atmospheric attenuation and path radiance. The reflected light is also likely to be partially polarized. A methodology for allowing remote sensing imaging of the spectral, directional and polarization distribution parameters of the reflecting surface is established hereinafter.

A spectral element of the reflected solar radiance, $dL_r$ leaving the surface in the direction of the viewer is the product of the spectral bidirectional reflectance distribution function (SBRDF), $f_r$, and the irradiance, $dE_i$, in the direction from a portion of the source. That is $$dL_r(\theta_i, \psi_i, \theta_r, \psi_r; \lambda; E_i) = f_r(\theta_i, \psi_i, \theta_r, \psi_r; \lambda) dE_i(\theta_i, \psi_i). \qquad (1)$$

Light ray directions are given in spherical coordinates (θ, ψ). Subscript $i$ denotes quantities associated with the incident radiant flux and subscript $r$ denotes quantities associated with the reflected radiant flux. If there is no interaction between wavelength and the geometric dependence of reflection, then the SBRDF $$f_r(\theta_i, \psi_i, \theta_r, \psi_r; \lambda) = f_r(\theta_i, \psi_i, \theta_r, \psi_r) f_r(\lambda) \qquad (2)$$

is separable. The first portion of the separation, $f_r(\theta_i, \psi_i; \theta_r, \psi_r)$ $|sr^{-1}|$ is the bidirectional reflectance distribution function (BRDF), which described the geo-radiametric effect. The second separated portion $f_r(\lambda)$, $[nm^{-1}]$, is the spectral reflectance function that determines relative reflection as a function of λ.

There is a simple method that is useful to judge whether the SBRDF is separable or not. In the visible range, if a target does not change color when viewed from different direction, the SBRDF is separable. For earth surface optical remote sensing, many applications involved separable SBRDFs.

A Lambertain surface is a typical example with separable SBRDF. It has BRDF as follows:

$$f_r(\theta_i, \Psi_i, \theta_r, \Psi_r) = \rho/\pi, \quad (0 \leq \rho \leq 1) \qquad (3)$$

where the parameter ρ is invariant to the ray geometry ($\theta_i, \psi_i; \theta_r, \psi_r$) of illumination and viewing. When ρ=1, the Lambertain surface is perfectly diffuse or lossless. For surfaces that are not Lambertain, ρ is defined as the ratio of the radiance flux reflected by a sample surface to that which would be reflected by an ideal or lossless Lambertain standard surface irradiated in the same condition with the same ray geometry of the reflection as the sample. In general, this ratio depends on ($\theta_i, \psi_i; \theta_r, \psi_r$), the atmospheric attenuation for low altitude remote sensing applications or atmospheric attenuation anisotropy in certain wavelength ranges, both the intrinsic BRDF and $f_r(\lambda)$ are remotely measurable by a hybrid VIFIS sensor system. Such a hybrid VIFIS system is composed of two identical image sensors that are perfectly aligned, covering the same field of view. One is fitted with a variable interference filter and the other with a normal uniform bandpass filter with a reference pass wavelength at $\lambda_r$. The ratio of the reflectance at any wavelength λ to the reference wavelength $\lambda_r$ at the same pixel site is then derived as $$R_{\lambda/\lambda_r} = \frac{f_r(\lambda)}{f_r(\lambda_r)} = \frac{dL_r(\theta_i, \phi_i; \theta_r, \phi_r; \lambda; E_i)}{dL_r(\theta_i, \phi_i; \theta_r, \phi_r; \lambda_r; E_i)} \qquad (4)$$

$dL_r(\theta_i, \psi_i, \theta_r, \psi_r, \lambda; E_i)$ and $dL_r(\theta_i, \psi_i, \theta_r, \psi_r, \lambda_r; E_i)$ are the two spectral radiances arriving at the front of the sensor pair respectively. If each sensor of the pair has the same linear response, it is obviously that this ratio $R_{\lambda/\lambda_r}$ is simply the ratio of the two digital numbers which are the output of the two different sensors respectively over the same pixel site. By referring to the middle portion of Equation (4), it is apparent that $R_{\lambda/\lambda_r}$ is independent of the ray geometry ($\theta_i, \psi_i, \theta_r, \psi_r$) anywhere across the field of view of the sensor. Hence, by then using the pushbroom queue processing algorithm (Sun and Anderson, 1991), the contiguous bands of the ratio-track-recovery-images are obtainable in the usual way. We then have a series of images each corresponding to a particular wavelength of the reflected radiation.

Similarly, for the case of the SBRDF being separable and the atmospheric influence being neglected, the ratio of the BRDF for the same sample at any forward or backward angel along the flight direction to that at the reference nadir, $R_{BRDF\ obligue/BRDF\ nadir}$ can be derived from the monochromatic sensor which is working at a single pass wavelength $\lambda_r$. That is $$R_{BRDF_{ABCDEF}/BRDF_{ABCD}} = \frac{f_r(\theta_i, \phi_i, \theta_r, \phi_r)}{f_r(\theta_i, \phi_i, \theta_{nadir}, \phi_{nadir})} \quad (5)$$

$$= \frac{dL_r(\text{forward/backward pointing})}{dL_r(\text{at nadir})}$$

Using the pushbroom queue processing algorithm to process the monochromatic sensor outputs, the resultant contiguous bands of track-recovery images are obtained as before. We then have a series of images corresponding to the bidirectional reflectance properties. By the way, $R_{BRDF\ obligue/BRDF\ nadir}$, could also be measurable using a panchromatic imager. This can be proved by superimposing Equation (5).

It can be demonstrated that any module of the hybrid VIFIS has no preferential direction to polarized light, hence, imaging polarization in any direction transverse to that of the light propagation is feasible if a polarizer is attached on to the VIFIS fore-optics.

So far, it is shown that a single pass with the hybrid VIFIS is associated with the measurement of wavelength spectral images, directional spectral images, and the polarization that may associate with these images.

It is possible to have a hybrid VIFIS system with two imagers wherein one is fitted with a variable interference filter and the other with a normal bandpass filter and such a system has the potential of acquiring both wavelength spectral image and directional spectral image for applications associated with separable spectral bidirectional reflectance distribution functions (SBRDFs). However, a three-sensor hybrid VIFIS system 10 is more practical as well as having other benefits. Major considerations leading to the preferred embodiment of the three-imager-hybrid VIFIS system 10 include the following:

1. Three channel signal outputs of the hybrid VIFIS system 10 can be combined into the format of the standard RGB video signal to ease the VIFIS primary data handling using commercially available desktop video equipment is described hereinbefore;

2. By setting up three parallel data acquisition planes, which are visible-range spectral filtering, near-infrared-range spectral filtering and monochromatic filtering (or panchromatic, which may be an even better reference with well balanced spectral weighing) respectively contiguous bands of differently combined, intrinsically co-registering, false color track recovery images are obtainable; and 3. Advantages are offered in terms of wider spectral coverage, flatter spectral response and more accurate focus by adopting two spectral filtering modules in the three imager hybrid VIFIS design.

To simplify airborne data acquisition, the hybrid VIFIS system 10 may be implemented as two separate parts, the easily-deployable airborne data acquisition payload and the ground based data processing computer system 80.

This concludes the description of the preferred embodiment. However, many modifications and alterations will be obvious to one of ordinary skill in the art without departing from the spirit and scope of the inventive concept.

Therefore, it is intended that the scope of this invention be limited by the appended claims.

What is claimed is:

1. An imaging spectrometer system comprising:
    means having at least one variable interference filter for acquiring spectral images over a predetermined spectral range;
    means positioned adjacent to said spectral images acquiring means for acquiring video graphic images for obtaining directional spectral data;
    means for synchronizing said spectral images acquiring means and said video graphic images acquiring means to enable acquiring said spectral images and said video graphic images simultaneously;
    means coupled to outputs of said spectral images acquiring means and said video graphic images acquiring means for conditioning said outputs for recording and processing; and
    means coupled to said spectral images acquiring means and said video graphic acquiring means for controlling a shutter speed of said spectral images acquiring means and said video graphic images acquiring means.

2. The imaging spectrometer system as recited in claim 1 wherein said variable interference filter acquires spectral images over said predetermined spectral range including a visible spectral range and a near-infrared spectral range.

3. The imaging spectrometer system as recited in claim 1 wherein said spectral images acquiring means comprises said variable interference filter positioned contiguous to a CCD sensor.

4. The imaging spectrometer system as recited in claim 1 wherein said spectral images acquiring means and said video graphic acquiring means are aligned to a common field of view.

5. The imaging spectrometer system as recited in claim 1 wherein said directional spectral data obtained from said video graphics acquiring means corrects said spectral images from said spectral images acquiring means by removing slant errors from said spectral images.

6. The imaging spectrometer system as recited in claim 1 wherein said means for controlling a shutter speed of said spectral images acquiring means and said video graphics images acquiring means includes monitoring said outputs by said conditioning means to control the spectral intensity impinging on a CCD of said spectral images acquiring means and said video graphics images acquiring means.

7. The imaging spectrometer system as recited in claim 1 wherein said conditioning means further comprises means for generating global positioning system information.

8. The imaging spectrometer system as recited in claim 1 wherein said conditioning means comprises means for converting said outputs to a single composite video signal for recording on an analog video recorder.

9. The imaging spectrometer system as recited in claim 1 wherein said conditioning means comprises means for digitizing said outputs to enable storing said outputs in a digital format.

10. The imaging spectrometer system as recited in claim 1 wherein said conditioning means comprises computer means for controlling the conditioning of said outputs from said spectral images acquiring means and said video graphic images acquiring means.

11. An imaging spectrometer system comprising:
    first camera means having a variable interference filter for acquiring spectral images in a visible spectral range;
    second camera means having a variable interference filter for acquiring spectral images in a near-infrared spectral range;

third camera means for acquiring video graphic images, said video graphic images being used to obtain directional spectral data;

means for synchronizing said first camera means, said second camera means and said third camera means to acquire said images simultaneously, said first camera means, said second camera means and said third camera means being aligned to a common field of view;

means coupled to outputs of said first camera means, said second camera means and said third camera means for conditioning said outputs for recording and processing; and means coupled to said first camera means, said second camera means and said third camera means for controlling a shutter speed of said first camera means, said second camera means, and said third camera means.

12. The imaging spectrometer system as recited in claim 11 wherein said conditioning means comprises means for transforming said outputs from a three-channel format to a single video signal stream.

13. The imaging spectrometer system as recited in claim 11 wherein said system comprises means coupled to said conditioning means for storing said composite video signal on an analog video recorder.

14. The imaging spectrometer system as recited in claim 13 wherein said system comprises means coupled to said storing means for post-processing said composite video signals.

15. The imaging spectrometer system as recited in claim 11 wherein said conditioning means further comprises means for digitizing said outputs of said first camera means, said second camera means and said third camera means for storing said outputs in a digital format.

16. The imaging spectrometer system as recited in claim 11 wherein said directional spectral data obtained from said third camera means corrects said spectral images from said first camera means and said second camera means by removing slant errors from said spectral images.

17. The imaging spectrometer system as recited in claim 11 wherein said conditioning means comprises a data acquisition computer means for controlling the acquisition and storage of said outputs from said first camera means, said second camera means, and said third camera means.

18. The imaging spectrometer system as recited in claim 11 wherein said means for controlling said shutter speed of said first camera mans, said second camera means and said third camera means includes monitoring said outputs by said conditioning means to control the spectral intensity impinging on a CCD of said first camera means, said second camera means and said third camera means.

19. The imaging spectrometer system as recited in claim 11 wherein said visible spectral range variable interference filter is aligned and attached to a CCD sensor in said first camera means.

20. The imaging spectrometer system as recited in claim 11 wherein said near infrared spectral range variable interference filter is positioned, aligned and attached to a CCD sensor in said second camera means.

21. The imaging spectrometer system as recited in claim 11 wherein said conditioning means further comprises means for generating global positioning system information.

22. A method of providing an imaging spectrometer system comprising the steps of:

acquiring spectral images over a predetermined spectral range with means having at least one variable interference filter;

acquiring video graphic images with means positioned adjacent to said spectral images acquiring means to obtain directional spectral data;

synchronizing said spectral images acquiring means and said video graphic images acquiring means to enable acquiring said spectral images and said video graphic images simultaneously;

conditioning outputs of said spectral images acquiring means and said video graphic images acquiring means for recording and processing said outputs with means coupled to said outputs; and controlling a shutter speed of said spectral images acquiring means and said video graphic images acquiring means.

23. The method as recited in claim 22 wherein said step of acquiring spectral images over a predetermined spectral range with said variable interference filter includes the step of acquiring spectral images over a visible spectral range and a near-infrared spectral range.

24. The method as recited in claim 22 wherein said step of acquiring spectral images with means having at least one variable interference filter comprises the step of positioning said filter contiguous to a CCD sensor of said acquiring means.

25. The method as recited in claim 22 wherein said spectral imaging acquiring means and said video graphic images acquiring means are aligned to a common field of view.

26. The method as recited in claim 22 wherein said step of acquiring video graphic images to obtain directional spectral data comprises the step of correcting said spectral images with said directional spectral data by removing slant errors from said spectral images.

27. The method as recited in claim 22 wherein said step of controlling a shutter speed of said spectral imaging acquiring means and said video graphic images acquiring means comprises the step of monitoring said outputs by said conditioning means to control the spectral intensity impinging on a CCD of said spectral images acquiring means and said video graphic images acquiring means.

28. The method as recited in claim 22 further comprises the step of providing global positioning system information for use with said spectral images.

29. The method as recited in claim 22 wherein said step of conditioning outputs of said spectral images acquiring means and said video graphic images acquiring means comprises the step of transforming said outputs to a single composite video signal for recording on an analog video recorder.

30. The method as recited in claim 22 wherein said step of conditioning outputs of said spectral images acquiring means and said video graphic images acquiring means comprises the step of digitizing said outputs to enable storing said outputs in a digital format.

* * * * *